United States Patent Office 3,733,204
Patented May 15, 1973

3,733,204
METHOD OF FEEDING CHITINOUS MEAL TO CRUSTACEA
Keir Charles Campbell, Carlton, near Goole, England, assignor to Ranks Hovis McDougall Limited, London, England
No Drawing. Filed Mar. 2, 1970, Ser. No. 15,940
Claims priority, application Great Britain, Mar. 7, 1969, 12,272/69
Int. Cl. A23k 1/18
U.S. Cl. 99—2 R       8 Claims

ABSTRACT OF THE DISCLOSURE

A method for the intensive farming of crustacea, e.g. prawns, in which, to increase survival rate, the growing crustacea are fed a prepared food composition comprising a chitinous meal. The chitinous meal may be a meal from the waste parts of crustacea, e.g. of crustacea previously reared by the same method, and is preferably provided in pellets containing also the other components of a balanced feed for the crustacea.

---

This invetion relates to the industrialised farming of crustaceans.

When crustaceans, e.g., prawns, are enclosed for this purpose, e.g. in lagoons, ponds, tanks, or cages, it has been observed that they are frequently cannabalistic. This cannabalism usually begins with the biting off and eating of the appendages and other projecting body parts of the animals by neighbouring crustaceans, and can lead to the death of the animal whereupon neighbouring crustaceans will devour the dead corpse. Crustaceans grow by moulting their hard exoskeleton which forms a protective shell for the animal. Just after moulting the new exposed shell of the crustacean is soft and remains so for a period of time, and it is at this time when the newly moulted crustacean is especially vulnerable to the attacks of other crustaceans. The rate of cannabalism has been observed to increase with increased stocking densities of crustaceans and was thought to be mainly dependent on the number of crustaceans stocked in a given area rather than any other cause.

This tendency to cannabalism is a major problem in attempts to rear crustaceans artificially on a commercial scale, where high stocking densities (above ½ kilogramme of total prawn weight per square meter) and survival rate are required for efficient operation.

Surprisingly, we have now found that by feeding the crustaceans food compositions containing chitin, cannabalism can be significantly reduced and growth rates increased, permitting efficient intensive farming of the animals.

A readily available product effective for this purpose is waste shells and heads of crustaceans which have been processed in canning or freezing plants. One such product available is dried prawn meal which consists of the head and shell of the prawn but does not include the meat from the tail of the animal. Crab products of a similar nature are also available.

Chitin is also found in animals of the Orders Coelenterata, Annelida, Mollusca, and Branchiopoda, but such chitin is of the $\beta$ type; it may also be possible to produce chitin synthetically and chitin is also found in animals of the Class Insecta. All of the above sources of chitin may be processed to yield chitin-containing feeds for use in the invention.

Insect and crustacean products contain high amounts of chitin which in crustaceans has been shown to be a high molecular weight polymer of anhydro-N-acetylglucosamine residues joined by ether linkages of the $\beta$-glycosidic type between carbon atoms 1 and 4 of the adjacent residues. The molecular chains are very long, apparently at least several hundreds of the N-acetylglucosamine residues being linked together into one long molecule, and as far as is known show no branching. Chitin is often found in percentages of about 60–80% of the dry weight of the organic fraction of the shell in crustaceans. Other known constituents are calcite which is known to be present in either in either micro or macro crystalline form and various amino acids such as serine, analine and tyrosine.

The chitin, e.g., in the form of prawn or like meal, is preferably fed to the crustaceans in the form of pellets containing other necessary foodstuffs, the pellets including a binder which prevents their disintegration in the water whilst permitting their ready disruption and digestion by the crustaceans.

A typical prawn meal suitable for use in the method according to the invention had the following analysis:

| General analysis: | Percent |
|---|---|
| Water | 1.4 |
| Oil | 3.8 |
| Protein (N x 6.25) | 44.6 |
| Ash | 24.7 |
| Carbohydrate (by difference) | 25.5 |

| Minerals: | | |
|---|---|---|
| Calcium | percent | 6.83 |
| Phosphorous | do | 1.51 |
| Sodium | do | 1.09 |
| Potassium | do | 0.05 |
| Iron | p.p.m | 240 |
| Copper | p.p.m | 86 |
| Manganese | p.p.m | 20 |
| Zinc | p.p.m | 75 |
| Silica | percent | 1.84 |

| Amino acids: | Percent |
|---|---|
| Aspartic | 4.25 |
| Threonine | 1.92 |
| Serine | 1.82 |
| Glutamic | 6.49 |
| Proline | 2.54 |
| Glycine | 2.33 |
| Alanine | 2.27 |
| Valine | 2.83 |
| Cystine | 1.74 |
| Methionine | 2.17 |
| Isoleucine | 2.02 |
| Leucine | 3.63 |
| Tyrosine | 1.48 |
| Phenylalanine | 1.66 |
| Lysine | 3.76 |
| Histidine | 1.49 |
| Arginine | 1.27 |
| Tryptophan | Trace |

Chitin constitutes substantially all of the portion analysed as carbohydrated above.

For use as a feed in accordance with the invention, the prawn or like chitin-containing meal is preferably mixed with other ingredients in order to produce a compounded feedstuff. It is usual to include the prawn meal at a rate of 50–60%, by weight of the mixture, but a greater or lesser amount of prawn meal may be used.

One suitable prawn feed formulation includes:

| | Percent by weight |
|---|---|
| Prawn meal | 50–60 |
| Fish meal | 8 |
| Flour | 10 |
| Dried yeast | 10 |
| Cod liver oil | 2 | the remainder of the formulation consisting of minor ingredients and additives, such as mineral and vitamin supplements, together with one or more additional bulk nutrients such as grass meal, cotton seed meal, soya meal, distillers dried solubles, ground barley, starch etc. The cod liver oil is an optional component of the mixture, and part or all of the fish meal, flour or yeast may be replaced by one or more of the said additional bulk nutrients, the proportion of prawn meal preferably still constituting 50–60 wt. percent of the mixture.

A typical analysis for such a prawn feed is as follows:

| | Percent |
|---|---|
| Water | 2.0 |
| Oil | 6.5 |
| Protein (N x 6.25) | 40.8 |
| Ash | 16.0 |
| Carbohydrate (including chitin) (by difference) | 34.7 |

A typical prawn meal, such as that whose analysis is given above, contains up to 26 wt. percent of chitin, and other crustacean (e.g. crab or lobster) meals can contain considerably more. A feed containing the preferred amount of the above prawn meal thus has a chitin content of about 15 wt. percent. If synthesised or natural chitin from another source is employed it may also constitute this proportion of the total prepared feed. The above proportion of chitin has been found suitable in the rearing of prawns, but more or less of this material (e.g., 5 or 10 up to 30 or 40 wt. percent or more) can of course be employed. The optimum proportion for economic and efficient rearing will vary according to the source of the chitin, the species being reared and the rearing environment, and can be ascertained in any particular instance by simple experiment.

In order to be acceptable to the prawns the feed should be bound together into small agglomerates, since most of the ingredients of the prawn feed are in a granular or powder form and are too fine for the prawn to pick up and eat. Because of this a suitable binder should be used to bind the prepared feed mix into agglomerates of appropriate size, e.g. in the case of prawns, into one eighth inch cubes or spherical agglomerates of about the same diameter. Such pellets can be made using standard extrusion principles (such as spaghetti machinery), the feed being extruded and subsequently dried and reduced to size. Spherical agglomerates can be made using the usual commercial agglomerating machinery.

Such pellets have been used on a mass culture scale for prawns at stocking densities of above ½ kilo per square meter and have been shown to increase growth and reduce cannibalism and increase the survival rate of the animals.

Such a prepared and pelleted feed formulation is preferably fed to the prawns at the rate of 2% to 3% of the current total weight of prawns per day.

The following example illustrates the beneficial effect on survival and growth rate obtainable by feeding chitin according to the invention.

EXAMPLE 20 prawns of the species *Macrobrachium rosenbergi* of the same initial weight (0.1 gm.) were kept under the same conditions in each of five separate tanks each of 2.7 ft. in area for 113 days. Results were as follows:

Prawns fed pellets containing 50% prawn meal

| | Percent survival | Average weight, grams |
|---|---|---|
| 1 | 80 | 3 |
| 2 | 85 | 3 |
| 3 | 80 | 3 |

Prawns fed pellets containing no prawn meal

| | | |
|---|---|---|
| 4 | 28 | 2.2 |
| 5 | 66 | 1.6 |

In each case the rate of feeding was the same, and the pellets were of the same size. The prawn feed formulation for experiments 1 to 3 was the typical formulation listed above containing 50 wt. percent prawn meal, the remainder of the formulation (20 wt. percent) being extracted soya meal and mineral and vitamin supplements. In the feed for experiments 4 and 5 the prawn meal was omitted and the proportion of fish meal increase to 58 wt. percent.

Similar marked increase in growth and survival rates due to the feeding of chitin-containing feeds has been noted in experiments conducted at stocking densities of 1 kilo per square meter and above.

A preferred embodiment of the invention involves a cyclic procedure in which crustaceans are reared to maturity in a tank or other enclosure, the growing crustaceans being fed a chitin containing meal prepared from the waste shells of crustaceans reared by the same method.

I claim:

1. In a method for the intensive rearing of crustacea in which immature crustacea are retained in an enclosure and reared to maturity, the improvement which comprises increasing the survival rate amongst said crustacea by feeding to them a food composition comprising a dried chitinous meal.

2. A method as claimed in claim 1 wherein said dried chitinous meal is dried chitinous meal prepared from the waste parts of crustacea consisting of heads and shells.

3. A method as claimed in claim 1 wherein said dried chitinous meal is dried crustaecean meal, said dried crustacean meal comprising meal prepared from the heads and shells of crustacea previously reared by said method.

4. A method as claimed in claim 1 wherein said dried chitinous meal is dried prawn meal.

5. A method as claimed in claim 1 wherein said crustacea are prawns.

6. The method of claim 1 wherein said food composition is in the form of pellets containing said dried chitinous meal.

7. In a method for the intensive rearing of crustacea in which immature crustacea are retained in an enclosure and reared to maturity, the improvement that increases survival rate amongst crustacea which comprises providing a dried meal consisting of waste heads and shells of crustaceans, preparing a food composition containing said dried meal and feeding said food composition to said crustacea.

8. In a method for the intensive rearing of shrimp in which prawns are retained in an enclosure and reared to maturity, the improvement that increases the survival rate amongst said prawns which comprises providing a dried meal consisting of waste heads and shells of prawns substantially devoid of the tail meat thereof, preparing a food composition in the form of pellets from said dried meal and feeding said pellets to said prawns.

References Cited
UNITED STATES PATENTS

| 3,264,116 | 8/1966 | Gray | 99—140 R |
| 3,620,754 | 11/1971 | Kanemitsu | 99—3 |
| 3,477,406 | 11/1969 | Fujinaga | 119—2 |
| 2,371,682 | 3/1945 | Eisaman | 99—2 |
| 2,783,148 | 2/1957 | Gyorgy et al. | 99—2 |
| 3,428,459 | 1/1969 | Hinds | 99—3 |
| 2,904,436 | 9/1959 | Auerbach | 99—2 |
| 2,555,088 | 11/1951 | Irwin | 99—3 |
| 3,410,689 | 11/1968 | Nathan | 99—3 |

NORMAN YUDKOFF, Primary Examiner

C. P. RIBANDO, Assistant Examiner

U.S. Cl. X.R.

99—3; 119—2